United States Patent
Gough et al.

(10) Patent No.: US 9,244,521 B2
(45) Date of Patent: Jan. 26, 2016

(54) SUPPORTING RUNTIME D3 AND BUFFER FLUSH AND FILL FOR A PERIPHERAL COMPONENT INTERCONNECT DEVICE

(71) Applicant: Intel Corporation, Santa Clara, CA (US)

(72) Inventors: Robert Gough, Sherwood, OR (US); Ismail Ebrahim, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 14/133,079

(22) Filed: Dec. 18, 2013

(65) Prior Publication Data

US 2014/0181559 A1 Jun. 26, 2014

(30) Foreign Application Priority Data

Dec. 26, 2012 (IN) .............................. 5446/CHE/2012

(51) Int. Cl.
*G06F 1/32* (2006.01)

(52) U.S. Cl.
CPC ........... *G06F 1/3287* (2013.01); *Y02B 60/1282* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
USPC .................. 713/300, 310, 320, 322, 323, 330
See application file for complete search history.

(56) References Cited

U.S. PATENT DOCUMENTS

| | | | |
|---|---|---|---|
| 6,901,522 B2 * | 5/2005 | Buch | 713/320 |
| 7,546,409 B2 | 6/2009 | Gough et al. | |
| 7,606,962 B2 | 10/2009 | Gough et al. | |
| 7,694,164 B2 | 4/2010 | Chakravarthy et al. | |
| 7,818,496 B2 | 10/2010 | Cooper et al. | |
| 7,984,314 B2 | 7/2011 | Cooper et al. | |
| 8,161,322 B2 | 4/2012 | Gough | |
| 2003/0191931 A1 * | 10/2003 | Yonemura | 713/1 |
| 2004/0025063 A1 * | 2/2004 | Riley | 713/300 |
| 2004/0128564 A1 * | 7/2004 | Dubinsky | 713/300 |
| 2006/0085654 A1 * | 4/2006 | Nokkonen | 713/300 |
| 2006/0117192 A1 * | 6/2006 | Nokkonen | 713/300 |
| 2006/0190745 A1 * | 8/2006 | Matsushima et al. | 713/300 |
| 2006/0248257 A1 * | 11/2006 | Kojima | 710/316 |

(Continued)

FOREIGN PATENT DOCUMENTS

| | | |
|---|---|---|
| CN | 1308785 | 4/2007 |
| KR | 101158204 | 6/2012 |

(Continued)

*Primary Examiner* — Zahid Choudhury
(74) *Attorney, Agent, or Firm* — Patent Capital Group

(57) ABSTRACT

Particular embodiments described herein provide for an apparatus that includes a means for determining a power state for a device connected to a system, a means for determining that the device should change power states, and means for sending a signal to the device to put the device in a D3-cold state while the system is a G0/S0 state. In an embodiment, the device is a peripheral component interconnect (PCI) device. Also, the particular example implementation can include means for sending a WAKE# signal from a controller to the device to cause the device to exit the D3-cold state, wherein the WAKE# signal was sent from a designated WAKE# signal pin on the controller. In some embodiments, the WAKE# signal is not sent to other devices in the system.

23 Claims, 5 Drawing Sheets

(56) References Cited

U.S. PATENT DOCUMENTS

| | | | |
|---|---|---|---|
| 2009/0150662 A1* | 6/2009 | Desselle et al. | 713/100 |
| 2012/0074793 A1* | 3/2012 | Tamura et al. | 307/130 |
| 2012/0131256 A1* | 5/2012 | Dai et al. | 710/316 |
| 2012/0216055 A1* | 8/2012 | Dumas et al. | 713/320 |
| 2012/0324246 A1* | 12/2012 | Rahardjo et al. | 713/300 |
| 2013/0159754 A1* | 6/2013 | Wendt | 713/330 |
| 2013/0283070 A1* | 10/2013 | Jaussi et al. | 713/300 |
| 2013/0297955 A1* | 11/2013 | Balasubramanian et al. | 713/310 |
| 2014/0215252 A1* | 7/2014 | Fullerton et al. | 713/324 |

FOREIGN PATENT DOCUMENTS

| | | |
|---|---|---|
| KR | 101162156 | 6/2012 |
| TW | I259347 | 8/2006 |

\* cited by examiner

| POWER STATE | FUNCTION |
|---|---|
| D0 | OPERATION |
| D1 | DEFINED BY DEVICE |
| D2 | DEFINED BY DEVICE |
| D3 - HOT | PRIMARY POWER |
| D3 - COLD | NO CORE POWER, MAY OR MAY NOT HAVE AUXILIARY POWER |

FIG. 1A

| POWER STATE | FUNCTION |
|---|---|
| S0 | WORKING |
| S1 | STOP PROCESSING |
| S2 | PROCESSING OFF |
| S3 | STANDBY |
| S4 | HIBERNATION |
| S5 | SOFT OFF |

FIG. 1B

SUPPORTING RUNTIME D3 AND BUFFER FLUSH AND FILL FOR A PERIPHERAL COMPONENT INTERCONNECT DEVICE

CROSS-REFERENCE TO RELATED APPLICATIONS

This application is based on and claims the benefit of priority from Indian Patent Application No. 5446/CHE/2012 filed in the Indian Patent Office on Dec. 26, 2012, and entitled SUPPORTING RUNTIME D3 AND BUFFER FLUSH AND FILL FOR A PERIPHERAL COMPONENT INTERCONNECT DEVICE, the contents of which are hereby incorporated by reference in their entirety.

TECHNICAL FIELD

Embodiments described herein generally relate to power management requirements for an electronic device.

TECHNICAL FIELD

Embodiments described herein generally relate to providing for power savings in a processor environment.

BACKGROUND

As electronic devices become more complex and more ubiquitous in the everyday lives of users, more and more diverse requirements are placed upon them. For example, many electronic devices can operate on battery power, thus allowing users to operate these devices in many different circumstances. In addition, as capabilities of electronic devices become more extensive, many users may become reliant on the enhanced performance such capabilities provide. As these aspects of electronic devices have evolved, there has become an increasing need for power optimization so that users may enjoy longer battery life. However, under many circumstances, power optimization may sacrifice performance. For example, it would be advantageous if certain components of an electronic device could enter different power states as needed. Therefore, it will be highly beneficial for a user to be able to have the desired performance of a specific component when needed, and to have the specific component enter into a low power state during circumstances where the specific component is not needed.

BRIEF DESCRIPTION OF THE DRAWINGS

Embodiments are illustrated by way of example and not by way of limitation in the FIGURES of the accompanying drawings, in which like references indicate similar elements and in which:

FIG. 1A is a table illustrating processor power states according to at least one example embodiment;

FIG. 1B is a table illustrating sleep power states according to at least one example embodiment;

Figure 2:
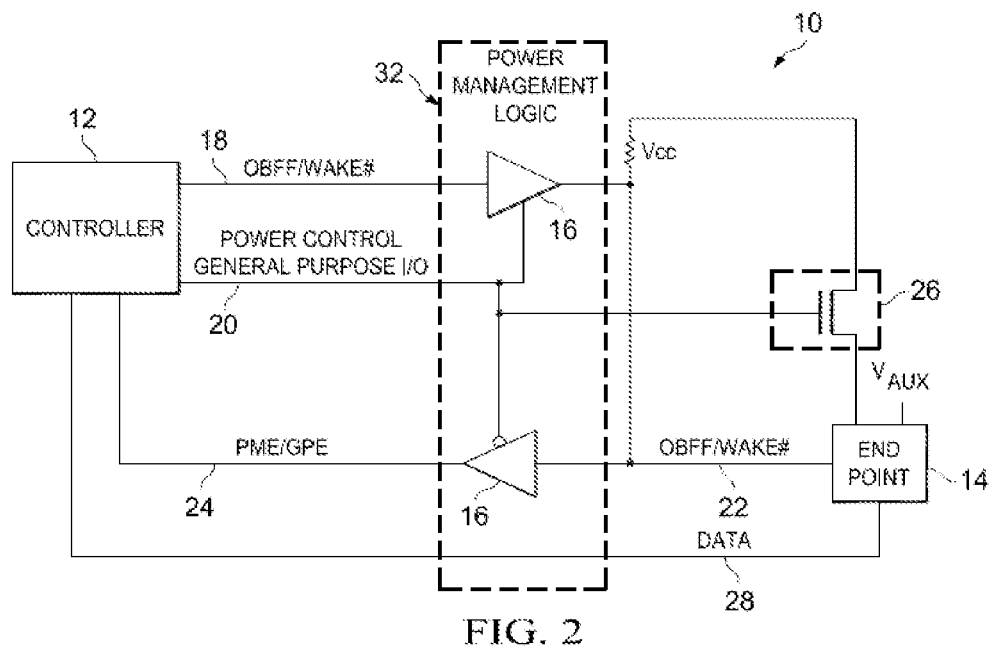
FIG. 2 is a simplified schematic diagram illustrating an embodiment of an electronic device, in accordance with at least one example embodiment of the present disclosure.

The FIGURES of the drawings are not necessarily drawn to scale or proportion, as their dimensions, arrangements, and specifications can be varied considerably without departing from the scope of the present disclosure.

DETAILED DESCRIPTION OF EXAMPLE EMBODIMENTS

The following detailed description sets forth example embodiments of apparatuses, methods, and systems relating to providing a power savings in a processor environment. Features such as structure(s), function(s), and/or characteristic(s), for example, are described with reference to one embodiment as a matter of convenience; various embodiments may be implemented with any suitable one or more of the described features.

The table of FIG. 1A lists device power states in descending order of performance. Device power states, for example under the ACPI standard, may be referred to as D-level states. Power state D0 is associated with the device being fully on and in an operating state. Power state D0 may be associated with absence of power or thermal savings, and may be referred to as an operation mode.

Power states D1 and D2 may be associated with intermediate power-states whose definition varies by device. Device power state D1 is the highest-powered device low-power state. The power consumption in a D1 state is less than in the D0 state but greater than or equal to that in the D2 state. Frequently, D1 is a clock-gated state in which the device receives just enough power to preserve the device's hardware context. Typically, the specification for a bus or device class that supports D1 describes this state in more detail. Regarding the device context, generally the device context is preserved by the hardware and need not be restored by the driver. The specification for a bus or device class that supports D1 typically provides detailed requirements for preserving this context. The device driver behavior must save and restore or reinitialize any context lost by the hardware. Typically, however, devices lose little context upon entering this state. The restore time (the time required to restore the device to D0 from D1) should be less than restoration from D2 to D0. Typically, devices that use D1 do so because resuming from this state does not require the driver to restore the device's full hardware context.

Power state D2 is an intermediate device low-power state where power consumption is less than or equal to that in the D1 state. In general, most device context is lost by the hardware when in a D2 state. Frequently, the state preserves the part of the context that is used to signal wake events. The specification for a bus or device class that supports D2 typically provides detailed requirements for preserving this context. A typical device loses most context when it enters D2 and therefore, device drivers must save and restore or reinitialize any context lost by the hardware. The restore time from D2 to D0 takes at least as long as restoring the device from D1 to D0. Typically, drivers that support D2 do so because their devices cannot support a wake from D3. For these devices, power consumption in the D2 state drops to the lowest level from which the device can recover in response to a wake signal. In contrast to the D1 state, which is implemented to reduce the delay perceived by the user, the goal in implementing the D2 state is to conserve power. As a result, the restore time from D2 to D0 typically exceeds that from D1 to D0. In the D2 state, for example, reduced power on the bus might cause a device to turn off some of its functionality, thus requiring additional time to restart and restore the device. Many classes of device do not define a D2 state.

Power State D3 has the device powered off and unresponsive to its bus. The D3 state may be referred to as a sleep state. The D3 state can be further divided into two sub-states, D3-hot and D3-cold. When a device is in a D3-hot state, the device has auxiliary power. When the device is in a D3-cold state, the device does not have any (or very little) power provided. A device in D3-hot can assert power management requests to transition to higher power states. The D3-hot and D3-cold states are discussed in more detail below with reference to FIG. 5. It should be understood that device power states may be further divided into sub-states that vary in power savings and recovery latency.

Programs may communicate regarding power states by using information indicating power state information. For example, there may be a variable, a message parameter, and/or the like that comprises information that indicates a power state. In addition, there may be a variable, a message parameter, and/or the like, that comprises information indicating a power state limitation. A power state limitation may be a limitation that restricts a power state that a device is allowed to enter. For example, a power state limitation may be a limitation that the power state should be no greater than D2, thus precluding power state D3. In at least one example embodiment, the power state limitation may apply to the ACPI standard. In such an embodiment, the power state limitation may constrain D-level settings.

Even though sleep power states described herein relate to the Advanced Control and Power Interface specification (ACPI), it should be understood that the ACPI is merely an example of a power management scheme that may be utilized to manage power in a processor or a system. Therefore, direct references to specific elements of the ACPI do not limit the claims, unless such specific elements are expressly incorporated into the claims.

System power may be managed by placing the system, and/or one or more parts of the system, into power states that influence the operation of the system such that the power consumption of the system differs across different power states. There may be a tradeoff associated with each power state between performance and power savings. For example, higher power saving power states may be associated with a longer delay in placing the system, and/or one or more parts of the system into a state that allows for execution of instructions.

The table of FIG. 1B lists sleep power states in descending order of performance. System power states, under the ACPI standard, may be referred to as S-level states. Power state S0 is associated with normal operation of the system and may be associated with absence of power or thermal savings. Power state S0 may be referred to as a working mode. Power states S1-S4 relate to various depths of sleep-based power saving. Power state 51 may be associated with a power saving state for which instruction execution may restart with the lowest recovery latency of the S1-S4 states, but with the lowest power saving of the S1-S4 states. Power state S1 may involve flushing processor caches, terminating processor execution, retaining power to RAM and the processor, and reducing power to devices in the system that fail to indicate a need to avoid reduced power. Power state S1 may be referred to as a stop-processing mode.

Power state S2 may be associated with a power saving state for which instruction execution may restart with a longer recovery latency than the S1 state, but with the greater power saving than the S1 state. Beyond the power saving actions of S1, power state S2 may involve powering off the processor and flushing a dirty cache to RAM. Power state S2 may be referred to as a processing-off mode.

Power state S3 may be associated with a power saving state for which instruction execution may restart with a longer recovery latency than the S2 state, but with the greater power saving than the S2 state. Beyond the power saving actions of S2, power state S3 may involve powering off all components except a real time clock and memory, which may operate at a reduced power level. Power state S3 may be referred to as a standby mode.

Power state S4 may be associated with a power saving state for which instruction execution may restart with a longer recovery latency than the S3 state, but with the greater power saving than the S3 state. Beyond the power saving actions of S3, power state S4 may involve storing volatile memory contents to non-volatile memory and terminating power to memory. Power state S4 may be referred to as a hibernation mode. Power state S5 may be associated with a power saving state that avoids saving system context information. Power state S5 may be terminated by pressing a power button and is often referred to as a soft-off mode. It should be understood that power states may be further divided into sub-states that vary in power savings and recovery latency as desired.

Programs may communicate regarding system power state by using information indicating power state information. For example, there may be a variable, a message parameter, and/or the like that comprises information that indicates a power state. In addition, there may be a variable, a message parameter, and/or the like, that comprises information indicating a power state limitation. A power state limitation may be a limitation that restricts a power state that the system is allowed to enter. For example, a power state limitation may be a limitation that the power state should be no greater than S2, thus precluding power states S3, S4, and S5. In at least one example embodiment, the power state limitation may apply to the ACPI standard. In such an embodiment, the power state limitation may constrain S-level settings.

FIG. 2 is a simplified schematic diagram illustrating an embodiment of an electronic device 10, in accordance with at least one example embodiment. Electronic device 10 includes a controller 12, buffers 16, an endpoint 14, a switch 26, and a power management module 32. Controller 12 may be a chip, an expansion card, a stand-alone device that interfaces with a peripheral device, a plug in board, a single integrated circuit on the motherboard, an external device, etc. End point 14 may be a Peripheral Component Interconnect (PCI) endpoint. As used herein, the term "PCI" is inclusive of PCI-X and PCI Express. Power management module 32 includes an assembly of electronic components and associated wiring and can be linked with other such units to form a larger system. While buffers 16 are shown as open-drain buffers, other circuit solutions (digital or analog) could produce the same logical result.

The examples of FIG. 2 are merely examples of an electronic configuration, and do not limit the scope of the claims. For example, the number of electrical components may vary, the placement of the electrical components may vary, and/or the like. Also, even though system and devices described herein relate to the PCI specification, it should be understood that PCI is used merely an example of one implementation. Therefore, direct references to PCI do not limit the claims, unless such specific elements are expressly incorporated into the claims.

PCI is a local computer bus for attaching hardware devices in a computer. The PCI bus supports the functions found on a processor bus, but in a standardized format that is independent of any particular processor. Devices connected to the bus appear to the processor to be connected directly to the processor bus, and are assigned addresses in the processor's address space. Attached devices can take the form of an integrated circuit fitted onto the motherboard itself, called a planar device in the PCI specification, or an expansion card that fits into a slot. Typical PCI cards used in PCs include: network cards, sound cards, modems, extra ports such as USB or serial, TV tuner cards, and disk controllers.

The PCI specification includes a signal WAKE#. WAKE# is defined in the PCI specification to be an input to a PCIe Root Complex (embodied in a CPU and chipset), and only used while the system is sleeping (e.g., Advanced Configuration and Power Interface (ACPI) states S3, S4, S5, all substrates of G2, etc.). The WAKE# signal is a shared, wire-OR, active-low, open-drain signal driven by a PCI Express endpoint to cause the system to exit an ACPI sleep state and enter a working or active state (e.g., G0/S0).

In an embodiment, a controller optimized buffer flush and fill (OBFF)/WAKE# signal 18 re-purposes a pin for the previously defined WAKE# signal as an output from controller 12 during S0/G0. OBFF/WAKE# signal 18 can be used as an indicator of host power state, to align data traffic, and interrupt activity with active CPU states and other devices.

When a power control general purpose I/O (GP I/O) signal 20 is active or on, OBFF/WAKE# signal 18 can allow endpoint 14 to be put into the same state (D3-cold) that it would be in while the system is in G2, but during runtime of the system (e.g., G0/S0). However, this could cause contention on OBFF/WAKE# signal 18 (which is shared throughout the platform and therefore could wake up the entire system) if an endpoint OBFF/WAKE# signal 22 (originating from endpoint 14) was connected to the same pin on controller 12 as OBFF/WAKE# signal 18. To solve this, OBFF/WAKE# signal 22 can be routed to an alternate input on controller 12. For example, OBFF/WAKE# signal 22 can be treated as a power management event (PME)/general purpose event (GPE) signal 24 by controller 12. PME/GPE signal 24 can be used to notify the operating system of the request (i.e., OBFF/WAKE# signal 22) from endpoint 14 to exit D3-cold and return to D0 without affecting the rest of the system.

This allows OBFF/WAKE# signal 18 from controller 12 to endpoint 14 to put endpoint 14 in a D0 after being in a D3-cold state or a D3-hot state. Additionally, OBFF/WAKE# signal 22 from endpoint 14 to controller can be treated as PME/GPE signal 24 when endpoint is in a D3-cold state and endpoint wants to wake up. When endpoint 14 is in any other state other than D3-cold, data signal 28 may be used for communications between controller 12 and endpoint 14. For example, in D3-hot, data signal 28 may be used when endpoint 14 wants to enter into another state.

Figure 3:
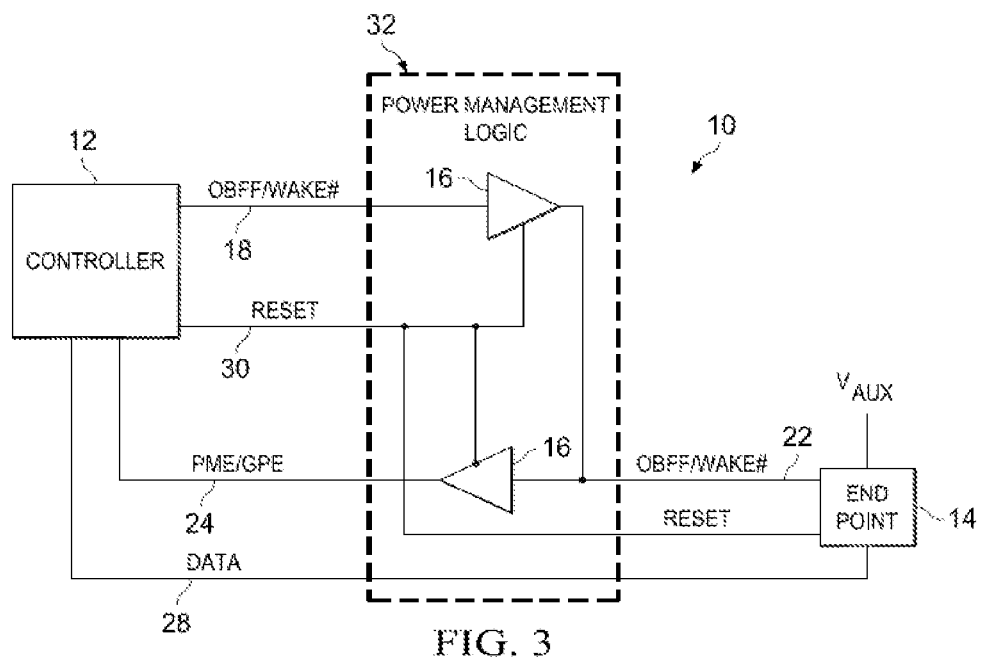
FIG. 3 is a simplified schematic diagram illustrating an embodiment of an electronic device, in accordance with at least one example embodiment of the present disclosure.

FIG. 3 is a simplified schematic diagram illustrating an embodiment of an electronic device 10, in accordance with at least one example embodiment. Electronic device 10 includes controller 12, buffers 16, endpoint 14, switch 26, and power management module 32.

The examples of FIG. 3 are merely examples of an electronic configuration, and do not limit the scope of the claims. For example, the number of electrical components may vary, the placement of the electrical components may vary, and/or the like. Also, even though system and devices described herein relate to the PCI specification PCI, it should be understood that PCI is used merely an example of one implementation. Therefore, direct references to PCI do not limit the claims, unless such specific elements are expressly incorporated into the claims.

The PCI specification includes a signal PCIRST#. When a PCIRST# signal is asserted, a device must tri-state all of its bus outputs and float its open drain outputs. The device's PCI target and bus master state machines are held in their reset state as long as the PCIRST# signal remains asserted. When the PCIRST# signal is de-asserted, the device's PCI target and bus master state machines remain in an idle state until the device is addressed in a PCI transaction.

In an embodiment, controller PCIRST# signal 30 re-purposes a pin for the previously defined PCIRST# signal as an output from controller 12 during a S0/G0 state. PCIRST# signal 30 can be used as an indicator of host power state, to align data traffic, and interrupt activity with active CPU states and other devices. For a device with only one power rail, one way for the device to tell the difference between D3-hot or D3-cold is the PCIRST# signal. PCIRST# signal 30 is an active low signal.

When PCIRST# signal 30 is active or on, OBFF/WAKE# signal 18 can allow endpoint 14 to be put into the same state (D3-cold) that it would be in while the system is in G2, but during runtime of the system (e.g., G0/S0). However, this could cause contention on OBFF/WAKE# signal 18 (which is shared throughout the platform and therefore could wake up the entire system) if an endpoint OBFF/WAKE# signal 22 (originating from endpoint 14) was connected to the same pin on controller 12 as OBFF/WAKE# signal 18. To solve this, OBFF/WAKE# signal 22 can be routed to an alternate input on controller 12. For example, OBFF/WAKE# signal 22 can be treated as PME/GPE signal 24 by controller 12. PME/GPE signal 24 can be used to notify the operating system of the request (i.e., OBFF/WAKE# signal 22) from endpoint 14 to exit D3 and return to D0 without affecting the rest of the system.

This allows OBFF/WAKE# signal 18 from controller 12 to endpoint 14 to put endpoint 14 in a D0 state after being in a D3-cold state or a D3-hot state. Additionally, OBFF/WAKE# signal 22 from endpoint 14 to controller can be treated as PME/GPE signal 24 when endpoint is in a D3-cold state and endpoint wants to wake up. When endpoint 14 is in any other state other than D3-cold, data signal 28 may be used for communications between controller 12 and endpoint 14. For example, in D3-hot, data signal 28 may be used when endpoint 14 wants to enter into another state.

Figure 4:
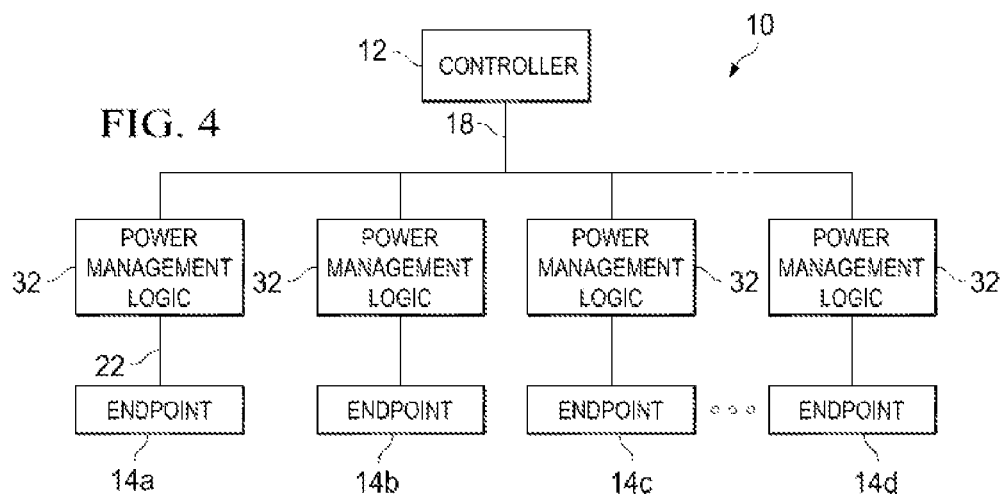
FIG. 4 is a simplified schematic diagram illustrating an embodiment of an electronic device, in accordance with at least one example embodiment of the present disclosure.

FIG. 4 is a simplified schematic diagram illustrating an embodiment of an electronic device 10, in accordance with at least one example embodiment. Electronic device 10 includes controller 12, power management module 32, and endpoints 14a-d. The examples of FIG. 4 are merely examples of an electronic configuration, and do not limit the scope of the claims. For example, the number of electrical components may vary, the placement of the electrical components may vary, and/or the like.

Using a power management module associated with an endpoint, controller 12 can put one or more endpoints into a reduced power state. In addition, one or more endpoints can exit a reduced power state and enter into a working or operation state without waking up the rest of the system. For example, controller may send a signal (using data signal 28) to put endpoint 14 in a reduced power state (e.g., a D1, D2, D3-hot, or D3 cold state) without affecting any of the other endpoints. If endpoint 14a is in a D3-cold state and data signal 28 is unavailable, then control 12 can send a signal (e.g., OBFF/WAKE# signal 18 or PCIRST# signal 30) to endpoint 14a causing endpoint 14a to exit the D3-cold state. Also, if endpoint 14a wants to exit the D3-cold state, endpoint 14a can send a signal (e.g., OBFF/WAKE# signal 22) to controller 12 indicating that endpoint 14a wants to exit the D3-cold state. The signal can be treated as PME/GPE signal such that the entire system does not change states.

Figure 5:
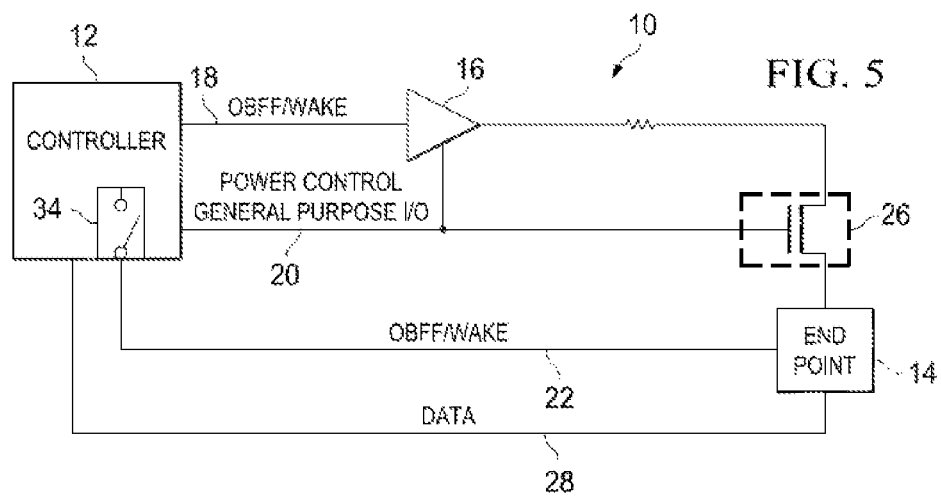
FIG. 5 is a simplified schematic diagram illustrating an embodiment of an electronic device, in accordance with at least one example embodiment of the present disclosure.

FIG. 5 is a simplified schematic diagram illustrating an embodiment of an electronic device 10, in accordance with at least one example embodiment. Electronic device 10 includes controller 12, buffers 16, endpoint 14, switch 26, and controller switch 34.

The examples of FIG. 5 are merely examples of an electronic configuration, and do not limit the scope of the claims. For example, the number of electrical components may vary, the placement of the electrical components may vary, and/or the like. Also, even though system and devices described herein relate to the PCI specification PCI, it should be understood that the PCI is merely an example of a scheme that may be utilized to manage power in a processor or a system. Therefore, direct references to PCI do not limit the claims, unless such specific elements are expressly incorporated into the claims.

When GP I/O signal 20 is active or on, OBFF/WAKE# signal 18 can allow endpoint 14 to be put into the same state (D3-cold) that it would be in while the system is in G2, but during runtime of the system (e.g., G0/S0). However, this could cause contention on OBFF/WAKE# signal 18 (which is shared throughout the platform and therefore could wake up the entire system) if an endpoint OBFF/WAKE# signal 22 (originating from endpoint 14) was connected to the same pin on controller 12 as OBFF/WAKE# signal 18. To solve this, controller switch 34 can be configured to ignore or disregard OBFF/WAKE# signal 22 if an OBFF/WAKE# signal 18 was sent from controller.

This allows OBFF/WAKE# signal 18 from controller 12 to endpoint 14 to put endpoint 14 in a D0 or D3-hot state. Additionally, OBFF/WAKE# signal 22 from endpoint 14 to controller can signal when endpoint wants to wake up from a D3-cold state. When endpoint 14 is in any other state other than D3-cold, data signal 28 may be used for communications between controller 12 and endpoint 14. For example, in D3-hot, data signal 28 may be used when endpoint 14 wants to enter into another state.

Figure 6:
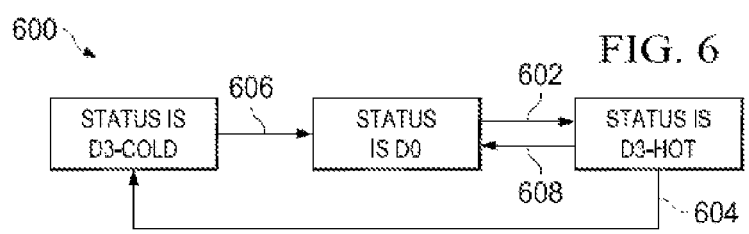
FIG. 6 is a diagram illustrating examples of power states.

FIG. 6 is a diagram illustrating examples of power states. The power states in example 500 include D0, D3-hot, and D3-cold. Transition 502 illustrates a transition from a D0 to a D3-hot state. Transition 504 illustrates a transition from a D3-hot to a D3-cold state as a data link is prepared for a low power mode and the OBFF/WAKE# buffers are reconfigured with power control and/or the PCIRST# signal. Transition 506 illustrates a transition from a D3-cold to a D0 state as the power is reapplied and the PCIRST# signal (if present) is deasserted. Transition 508 illustrates a transition from a D3-hot to a D0 state and the link is brought back to an operation state.

Typically, a device is implicitly in the D3-hot state if the device is explicitly in the D3 state and the system is in the S0 state. In the D3-hot state, a device is connected to a power source (although the device might be configured to draw low current), and the presence of the device on a bus can be detected. A device is implicitly in the D3-cold state if it is explicitly in the D3 state and the computer is in a low-power Sx state (a state other than S0). In this implicit D3-cold state, the device might receive a trickle current, but the device and the system are effectively turned off until a wake event occurs.

A device can enter and leave the D3-cold state while the system remains in the S0 state.

The D3-hot state is the only substate of the D3 state that the device can enter directly from a D0 state. A device makes a transition from a D0 to a D3-hot state under software control by the device driver. In a D3-hot state, the device can be detected on the bus that it connects to. The bus must remain in the D0 state while the device is in the D3-hot state. From the D3-hot state, the device can either return to a D0 or enter a D3-cold state. The D3-cold state can be entered only from the D3-hot state.

The D3-cold state is a substate of the D3 state in which the device is physically connected to the bus but the presence of the device on the bus cannot be detected (that is, until the device is turned on again). In a D3-cold state, the bus that the device connects to is in a low-power state and/or the device is in a low-power state in which the device does not respond when the bus driver tries to detect its presence on the bus. The transition from a D3-hot state to a D3-cold state occurs with no device driver interaction. Instead, the device driver indicates whether it is prepared for a D3-cold state transition before it initiates the transition from a D0 to a D3-hot state. Subsequently, a transition from a D3-hot to a D3-cold state may or may not occur, depending on whether all of the conditions are right to enable the transition.

A device that is in the D3-cold state can leave this state only by entering the D0 state. There is no direct transition from a D3-cold to a D3-hot state. When the system is in the S0 state and a device enters the D3-hot state, the device driver is typically unable to determine in advance whether the device's next transition will be to a D3-cold or a D0 state. The one exception is when the system is preparing to leave the S0 state. In this case, the next transition is to a D3-cold state.

In a D3-hot state, power is mostly removed from the device, but not from the computer as a whole. The computer, which is in the S0 state, might continue running in this state, or it might be preparing to move from a S0 state to a low-power Sx state. Also, the device driver is solely responsible for restoring device context. The driver must preserve and then restore all device context or must reinitialize the device upon transition to the D0 state. In addition, the device driver is solely responsible for restoring device context, typically from the most recent working configuration. The total restore time is the highest of any of the device power states, except for the D3-cold state, but is typically not much greater than the restore time from a D2 state. In a D3-hot state, only minimal trickle current is available and therefore, drivers and hardware must be prepared for the absence of power. The specification for a bus that supports a D3-hot state typically provides detailed requirements for power sources that can be used in this state. To return the device to the working state, the device's drivers must be able to restore and reinitialize the device without depending on the BIOS to run any code in the option ROM that might be available for the device.

In a D3-cold state, power has been fully removed from the device and possibly from the entire system. The device may be able to draw current from side-band sources, depending on its construction. The device driver is solely responsible for restoring device context and must preserve and then restore device context or must reinitialize the device upon transition to the D0 state. The device driver is solely responsible for restoring device context, typically from the most recent working configuration. The total restore time is the highest of any of the device power states.

Figure 7:
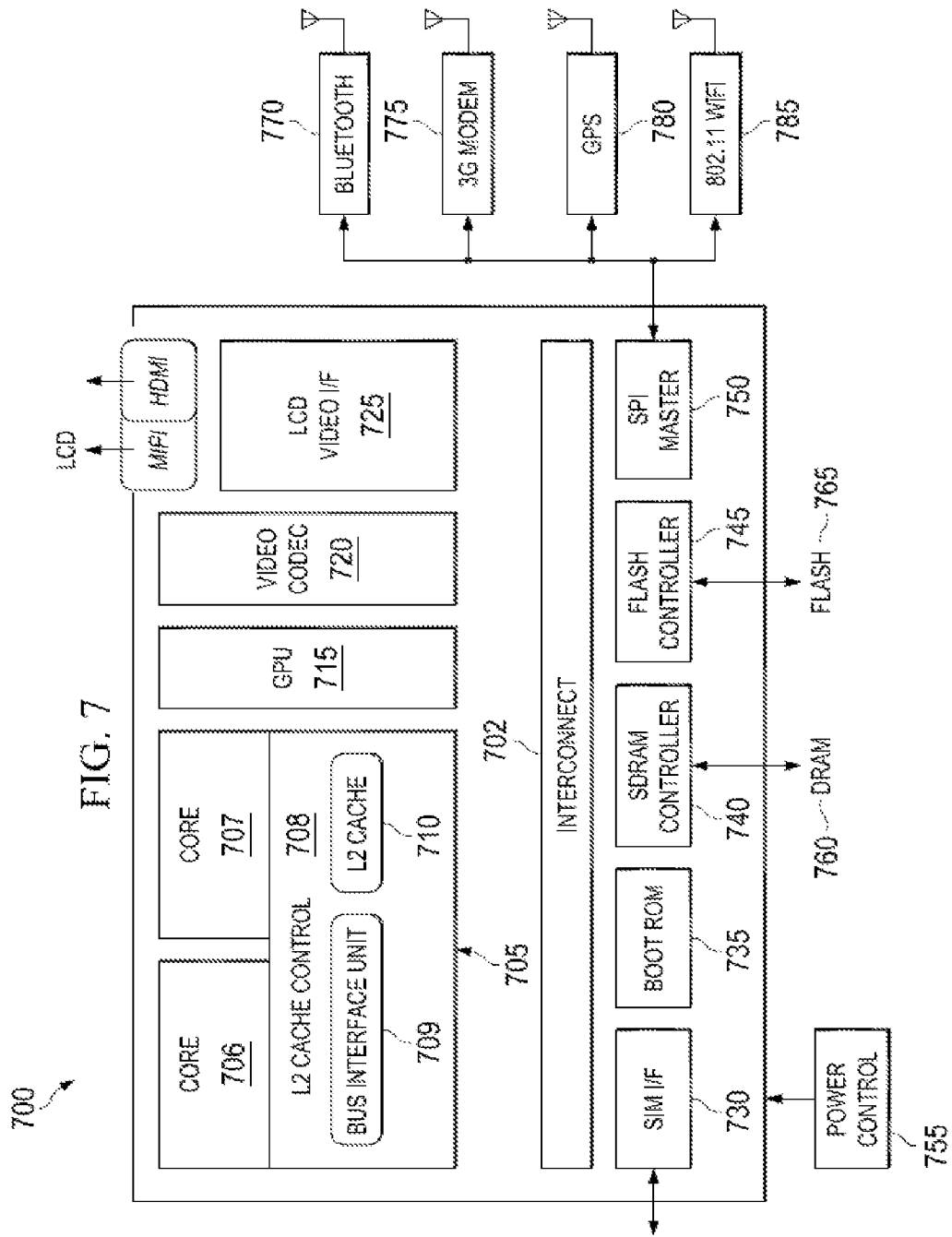
FIG. 7 is a simplified block diagram associated with an example ARM ecosystem system on chip (SOC) of the present disclosure.

FIG. 7 is a simplified block diagram associated with an example ARM ecosystem SOC 1000 of the present disclosure. At least one example implementation of the present disclosure includes an integration of the power savings features discussed herein and an ARM component. For example, the example of FIG. 7 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), any type of touch-enabled input device, etc.

In this example of FIG. 7, ARM ecosystem SOC 1000 may include multiple cores 1006-1007, an L2 cache control 1008, a bus interface unit 1009, an L2 cache 1010, a graphics processing unit (GPU) 1015, an interconnect 1010, a video codec 1020, and a liquid crystal display (LCD) I/F 1025, which may be associated with mobile industry processor interface (MIPI)/high-definition multimedia interface (HDMI) links that couple to an LDC.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiment include one or more communication capabilities, interfaces, and features such as instances of Bluetooth 1070, a 3G modem 1075, a global positioning system (GPS) 1080, and an 802.11 WiFi 1085.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
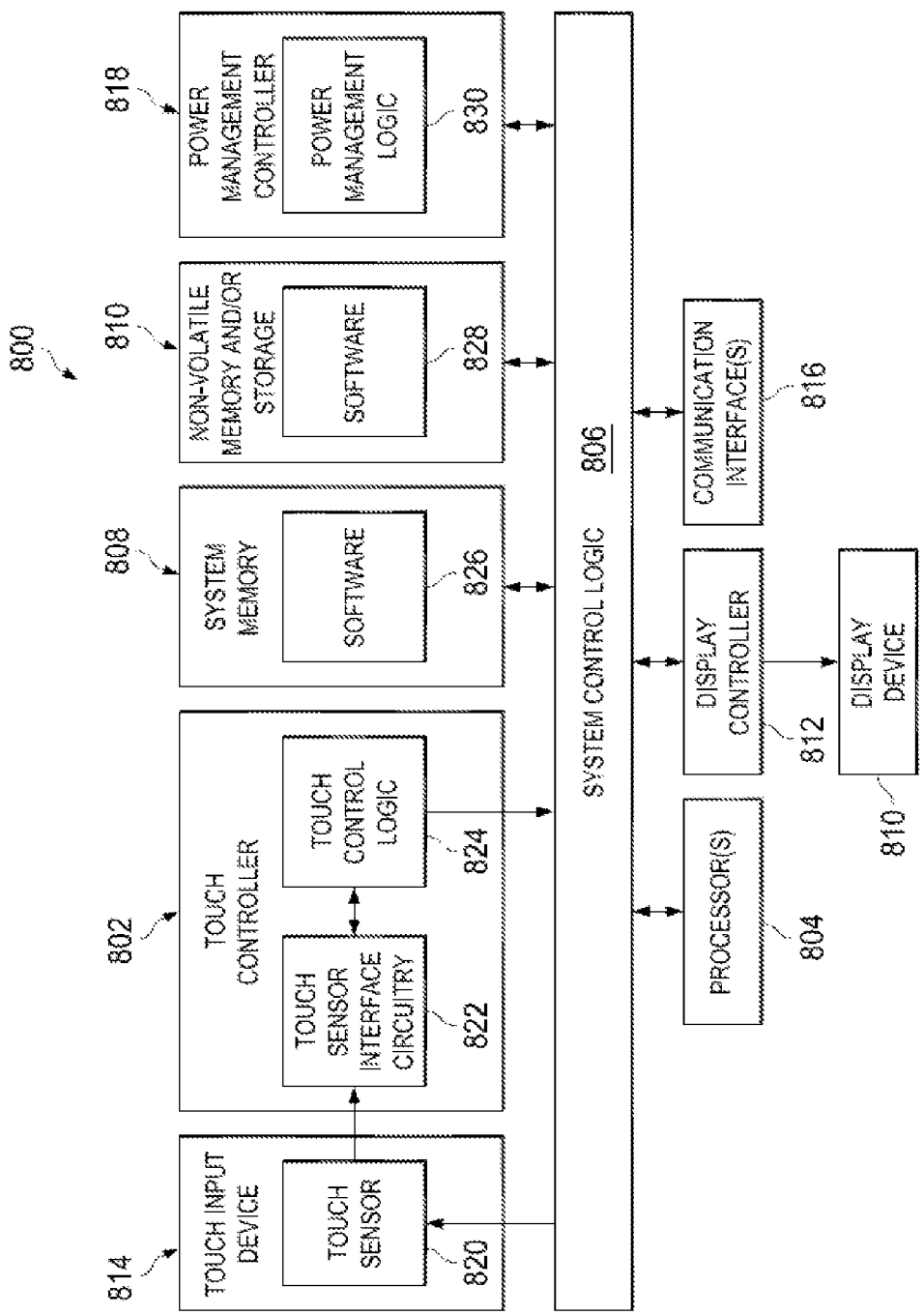
FIG. 8 is a simplified block diagram illustrating example logic that may be used to execute activities associated with the present disclosure.

FIG. 8 is a simplified block diagram illustrating potential electronics and logic that may be associated with any of the power saving operations discussed herein. In at least one example embodiment, system 1100 includes a touch controller 1102, one or more processors 1104, system control logic 1106 coupled to at least one of processor(s) 1104, system memory 1108 coupled to system control logic 1106, non-volatile memory and/or storage device(s) 1110 coupled to system control logic 1106, display controller 1112 coupled to system control logic 1106, display controller 1112 coupled to a display, power management controller 1118 coupled to system control logic 1106, and/or communication interfaces 1120 coupled to system control logic 1106.

System control logic 1106, in at least one embodiment, includes any suitable interface controllers to provide for any suitable interface to at least one processor 1104 and/or to any suitable device or component in communication with system control logic 1106. System control logic 1106, in at least one example embodiment, includes one or more memory controllers to provide an interface to system memory 1108. System memory 1108 may be used to load and store data and/or instructions, for example, for system 1100. System memory 1108, in at least one example embodiment, includes any suitable volatile memory, such as suitable dynamic random access memory (DRAM) for example. System control logic 1106, in at least one example embodiment, includes one or more I/O controllers to provide an interface to a display device, touch controller 1102, and non-volatile memory and/or storage device(s) 1110.

Non-volatile memory and/or storage device(s) 1110 may be used to store data and/or instructions, for example within software 1128. Non-volatile memory and/or storage device(s) 1110 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1118 may include power management logic 1130 configured to control various power management and/or power saving functions disclosed herein or any part thereof. In at least one example embodiment, power management controller 1118 is configured to reduce the power consumption of components or devices of system 1100 that may either be operated at reduced power or turned off when the electronic device is in a closed configuration. For example, in at least one example embodiment, when the electronic device is in a closed configuration, power management controller 1118 performs one or more of the following: power down the unused portion of the display and/or any backlight associated therewith; allow one or more of processor(s) 1104 to go to a lower power state if less computing power is required in the closed configuration; and shutdown any devices and/or components, such as keyboard 108, that are unused when an electronic device is in the closed configuration.

Communications interface(s) 1120 may provide an interface for system 1100 to communicate over one or more networks and/or with any other suitable device. Communications interface(s) 1120 may include any suitable hardware and/or firmware. Communications interface(s) 1120, in at least one example embodiment, may include, for example, a network adapter, a wireless network adapter, a telephone modem, and/or a wireless modem.

System control logic 1106, in at least one example embodiment, includes one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1104 may be packaged together with logic for one or more controllers of system control logic 1106. In at least one example embodiment, at least one processor 1104 may be packaged together with logic for one or more controllers of system control logic 1106 to form a System in Package (SiP). In at least one example embodiment, at least one processor 1104 may be integrated on the same die with logic for one or more controllers of system control logic 1106. For at least one example embodiment, at least one processor 1104 may be integrated on the same die with logic for one or more controllers of system control logic 1106 to form a System on Chip (SoC).

For touch control, touch controller 1102 may include touch sensor interface circuitry 1122 and touch control logic 1124. Touch sensor interface circuitry 1122 may be coupled to detect touch input over a first touch surface layer and a second touch surface layer of a display (i.e., display device 1110). Touch sensor interface circuitry 1122 may include any suitable circuitry that may depend, for example, at least in part on the touch-sensitive technology used for a touch input device. Touch sensor interface circuitry 1122, in one embodiment, may support any suitable multi-touch technology. Touch sensor interface circuitry 1122, in at least one embodiment, includes any suitable circuitry to convert analog signals corresponding to a first touch surface layer and a second surface layer into any suitable digital touch input data. Suitable digital touch input data for one embodiment may include, for example, touch location or coordinate data.

Touch control logic 1124 may be coupled to help control touch sensor interface circuitry 1122 in any suitable manner to detect touch input over a first touch surface layer and a second touch surface layer. Touch control logic 1124 for at least one example embodiment may also be coupled to output in any suitable manner digital touch input data corresponding to touch input detected by touch sensor interface circuitry 1122. Touch control logic 1124 may be implemented using any suitable logic, including any suitable hardware, firmware, and/or software logic (e.g., non-transitory tangible media), that may depend, for example, at least in part on the circuitry used for touch sensor interface circuitry 1122. Touch control logic 1124 for one embodiment may support any suitable multi-touch technology.

Touch control logic 1124 may be coupled to output digital touch input data to system control logic 1106 and/or at least one processor 1104 for processing. At least one processor 1104 for one embodiment may execute any suitable software to process digital touch input data output from touch control logic 1124. Suitable software may include, for example, any suitable driver software and/or any suitable application software. As illustrated in FIG. 8, system memory 1108 may store suitable software 1126 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that includes digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

EXAMPLE EMBODIMENT IMPLEMENTATIONS

One particular example implementation may include an apparatus that includes a means for determining a power state for a device connected to a system; means for determining that the device should change power states; and means for sending a signal to the device to put the device in a D3-cold state while the system is a G0/S0 state. In an embodiment, the device is a peripheral component interconnect (PCI) device. Also, the particular example implementation can include means for sending a WAKE# signal from a controller to the device to cause the device to exit the D3-cold state, wherein the WAKE# signal was sent from a designated WAKE# signal pin on the controller. In some embodiments, the WAKE# signal is not sent to other devices in the system.

What is claimed is:

1. A method for managing power and performance, comprising:
 determining a power state for a device connected to a system;
 determining that the device should change power states;
 sending a signal to the device to put the device in a D3-cold state while the system is a G0/S0 state; and
 sending a WAKE# signal from the device to a controller to cause the device to exit the D3-cold state when the device determines that the device should change power states, wherein the WAKE# signal is received at a pin on the controller that is different than a designated WAKE# signal pin.

2. The method of claim 1, wherein the device is a peripheral component interconnect (PCI) device.

3. The method of claim 2, further comprising:
 sending a WAKE# signal from the controller to the device to cause the device to exit the D3-cold state when the controller determines that the device should change power states, wherein the WAKE# signal was sent from a designated WAKE# signal pin on the controller.

4. The method of claim 3, wherein the WAKE# signal was not sent to other devices in the system.

5. The method of claim 2, further comprising:
 sending a PCIRST# signal from the controller to the device to cause the device to exit the D3-cold state when the controller determines that the device should change power states, wherein the PCIRST# signal was sent from a designated PCIRST# signal pin on the controller.

6. The method of claim 5, wherein the PCIRST# signal was not sent to other devices in the system.

7. The method of claim 5, further comprising:
 sending a PCIRST# signal from the device, instead of the WAKE# signal, to the controller to cause the device to exit the D3-cold state when the device determines that the device should change power states, wherein the PCIRST# signal is received at a pin on the controller that is different than a designated PCIRST# signal pin.

8. The method of claim 1, wherein a power control general purpose input/output signal is active.

9. An apparatus comprising at least one processor and at least one memory, the at least one memory comprising instructions that, when executed by the processor, cause the apparatus to:
 determine a power state for a device connected to a system;
 determine that the device should change power states;
 send a signal to the device to put the device in a D3-cold state while the system is a G0/S0 state; and
 send a WAKE# signal from the device to a controller to cause the device to exit the D3-cold state when the device determines that the device should change power states, wherein the WAKE# signal is received at a pin on the controller that is different than a designated WAKE# signal pin.

10. The apparatus of claim 9, wherein the device is a peripheral component interconnect (PCI) device.

11. The apparatus of claim 10, further comprising instructions that, when executed by the processor, cause the apparatus to:
 send a WAKE# signal from the controller to the device to cause the device to exit the D3-cold state when the controller determines that the device should change power states, wherein the WAKE# signal was sent from a designated WAKE# signal pin on the controller.

12. The apparatus of claim 11, wherein the WAKE# signal was not sent to other devices in the system.

13. The apparatus of claim 10, further comprising instructions that, when executed by the processor, cause the apparatus to:
 sending a PCIRST# signal from the controller to the device to cause the device to exit the D3-cold state when the controller determines that the device should change power states, wherein the PCIRST# signal was sent from a designated PCIRST# signal pin on the controller.

14. The apparatus of claim 13, wherein the PCIRST# signal was not sent to other devices in the system.

15. The apparatus of claim 13, further comprising instructions that, when executed by the processor, cause the apparatus to:
 sending a PCIRST# signal from the device to the controller, instead of the WAKE# signal, to cause the device to exit the D3-cold state when the device determines that the device should change power states, wherein the PCIRST# signal is received at a pin on the controller that is different than a designated PCIRST# signal pin.

16. A non-transitory computer readable medium comprising instructions that, when executed by a processor, cause an apparatus to:
 determine a power state for a device connected to a system;
 determine that the device should change power states; and
 send a signal to the device to put the device in a D3-cold state while the system is a G0/S0 state; and
 send a WAKE# signal from the device to a controller to cause the device to exit the D3-cold state when the device determines that the device should change power states, wherein the WAKE# signal is received at a pin on the controller that is different than a designated WAKE# signal pin.

17. The computer readable medium of claim 16, wherein the device is a peripheral component interconnect (PCI) device.

18. The computer readable medium of claim 17, further comprising instructions that, when executed by the processor, cause the apparatus to:
 send a WAKE# signal from the controller to the device to cause the device to exit the D3-cold state when the controller determines that the device should change power states, wherein the WAKE# signal was sent from a designated WAKE# signal pin on the controller.

19. The computer readable medium of claim 18, wherein the WAKE# signal was not sent to other devices in the system.

20. The computer readable medium of claim 17, further comprising instructions that, when executed by the processor, cause the apparatus to:
 sending a PCIRST# signal from the controller to the device to cause the device to exit the D3-cold state when the controller determines that the device should change power states, wherein the PCIRST# signal was sent from a designated PCIRST# signal pin on the controller.

21. The computer readable medium of claim 20, wherein the PCIRST# signal was not sent to other devices in the system.

22. The computer readable medium of claim 20, further comprising instructions that, when executed by the processor, cause the apparatus to:
 sending a PCIRST# signal from the device to the controller, instead of the WAKE# signal, to cause the device to exit the D3-cold state when the device determines that the device should change power states, wherein the PCIRST# signal is received at a pin on the controller that is different than a designated PCIRST# signal pin.

23. An apparatus, comprising:
means for determining a power state for a device connected to a system;
means for determining that the device should change power states;
means for sending a signal to the device to put the device in a D3-cold state while the system is a G0/S0 state; and
means for sending a WAKE# signal from the device to a controller to cause the device to exit the D3-cold state when the device determined that the device should change power states, wherein the WAKE# signal is received at a pin on the controller that is different than a designated WAKE# signal pin.

* * * * *

UNITED STATES PATENT AND TRADEMARK OFFICE
CERTIFICATE OF CORRECTION

PATENT NO. : 9,244,521 B2  
APPLICATION NO. : 14/133079  
DATED : January 26, 2016  
INVENTOR(S) : Robert Gough et al.

Page 1 of 1

It is certified that error appears in the above-identified patent and that said Letters Patent is hereby corrected as shown below:

In column 14, line 25, in claim 16, after "states;" delete "and".

Signed and Sealed this  
Third Day of May, 2016

Michelle K. Lee  
*Director of the United States Patent and Trademark Office*